Dec. 9, 1969            C. E. TACK            3,482,530
RAILWAY CAR ROLL STABILIZER
Filed June 15, 1967            3 Sheets-Sheet 1
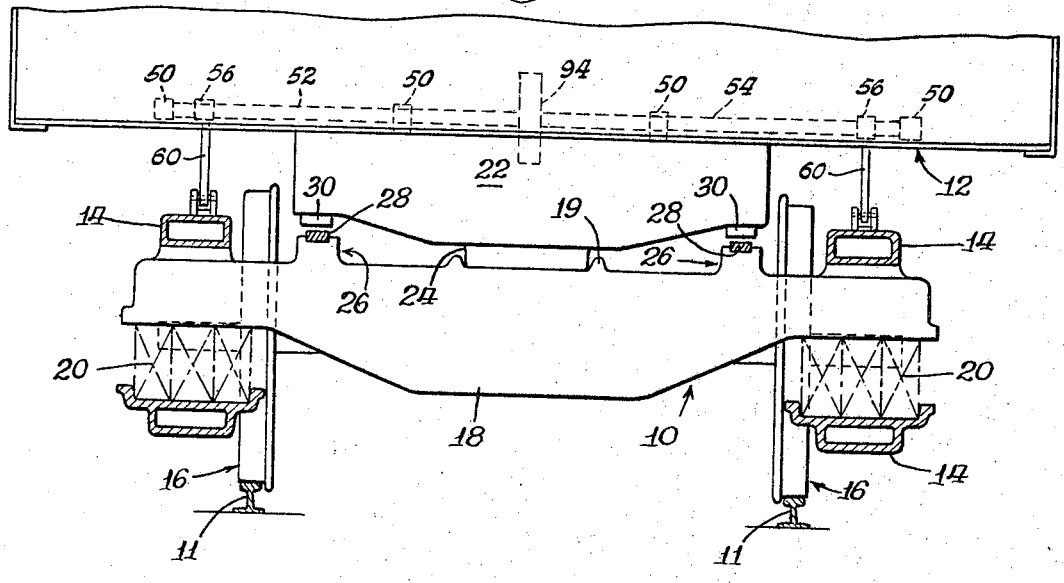
Fig. 1.
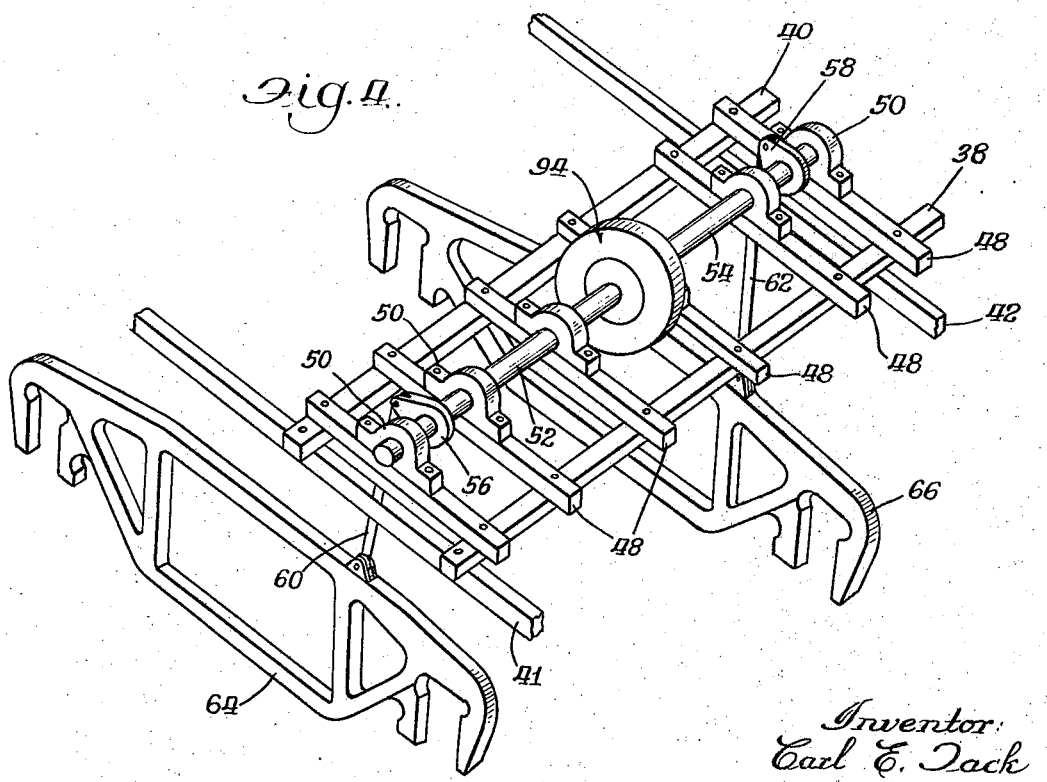
Fig. II.
Inventor:
Carl E. Tack
By Walter L. Schlegel, Jr.
Russell W. Pyle    Attys.

Dec. 9, 1969  C. E. TACK  3,482,530
RAILWAY CAR ROLL STABILIZER
Filed June 15, 1967  3 Sheets-Sheet 2

Inventor
Carl E. Tack
By Walter L. Schlegel Jr.
Russell W. Pyle  Attys.

Dec. 9, 1969 C. E. TACK 3,482,530
RAILWAY CAR ROLL STABILIZER
Filed June 15, 1967 3 Sheets-Sheet 3
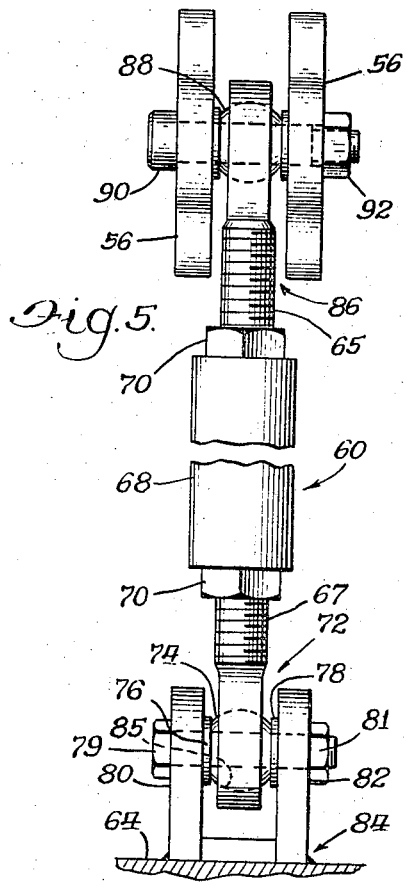
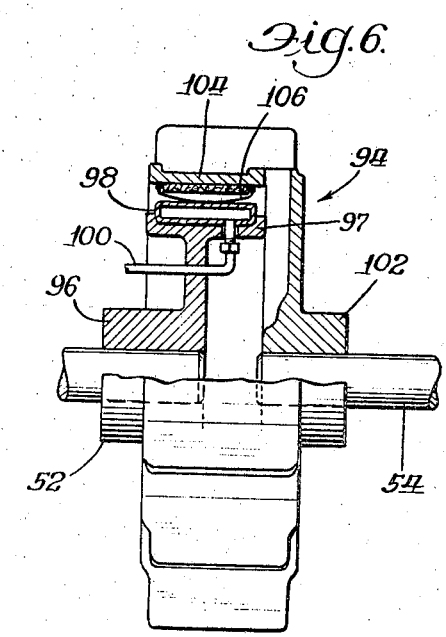
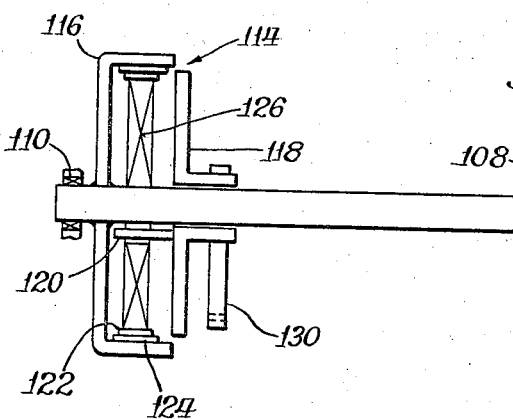
Inventor
Carl E. Tack
By Walter L. Schlegel, Jr.
Russell W. Pyle Attys

# United States Patent Office 3,482,530
Patented Dec. 9, 1969

3,482,530
RAILWAY CAR ROLL STABILIZER
Carl E. Tack, Elmhurst, Ill., assignor to Amsted Industries Incorporated, Chicago, Ill., a corporation of New Jersey
Filed June 15, 1967, Ser. No. 646,267
Int. Cl. B61f 5/50
U.S. Cl. 105—199                                8 Claims

ABSTRACT OF THE DISCLOSURE

Two coaxial shafts are mounted in bearings secured to a railway car body supported upon a car truck that includes side frames conventionally supported upon wheel and axle assemblies. Rocking motion of the car body relative to the side frames of the car truck is transmitted by connecting rods from the side frames through cranks secured to the outer ends of the shafts, thereby causing the shafts to rotate relative to one another. Alternatively, the shaft bearings may be secured to the car truck and the connecting rods may be connected from the car body. The inner ends of the shafts terminate in an energy dissipating device that resists relative rotation. The two coaxial shafts may be replaced by a single shaft with the energy dissipating device located at one end of the shaft and connected to one of the cranks and connecting rods.

---

This invention relates to stabilizing devices for railway vehicles and more particularly to a stabilizing device and actuating means therefor, which together inhibit lateral rolling or rocking of the car body relative to the car truck in such vehicles.

During the normal operation of a railway vehicle, vertical irregularities in the track may cause the car body to roll from side to side relative to the car truck at a certain frequency. As this frequency approaches the natural frequency of the railway vehicle, a condition of resonance may occur, thereby greatly amplifying the degree of roll. In order to minimize this effect, a countervailing force and means to dissipate energy is required between the car body and the car truck.

Accordingly, an object of this invention is to provide a device which will reduce lateral rocking of a railway car body relative to the car truck to a degree that will be acceptable in service.

Another object is the provision of means between a car body and a car truck for actuating a stabilizing device.

A further object of this invention is to provide a stabilizing device including torsion inhibiting frictonal means.

A still further object of this invention is to provide means in a railway vehicle selectively responsive to lateral rocking of the car body relative to the side frames of the truck and substantially unresponsive to conjoint vertical motions of both sides of the car body relative to both side frames.

The above and other objects will become apparent from the following specification and claims in connection with the accompanying drawings wherein:

FIGURE 1 is a schematic end view partly in cross section and with certain parts removed, of a conventional railway vehicle;

FIGURE 4 is a simplified perspective view of the invention shown in FIGURES 2 and 3;

FIGURE 5 is a detailed end elevational view of one of the connecting rods employed in the present invention;

FIGURE 6 is a simplified elevational view of a friction mechanism, partly in cross section; and FIGURE 7 is a schematic illustration, partly in cross section, of another embodiment of the present invention that utilizes a single shaft.

Figure 2:
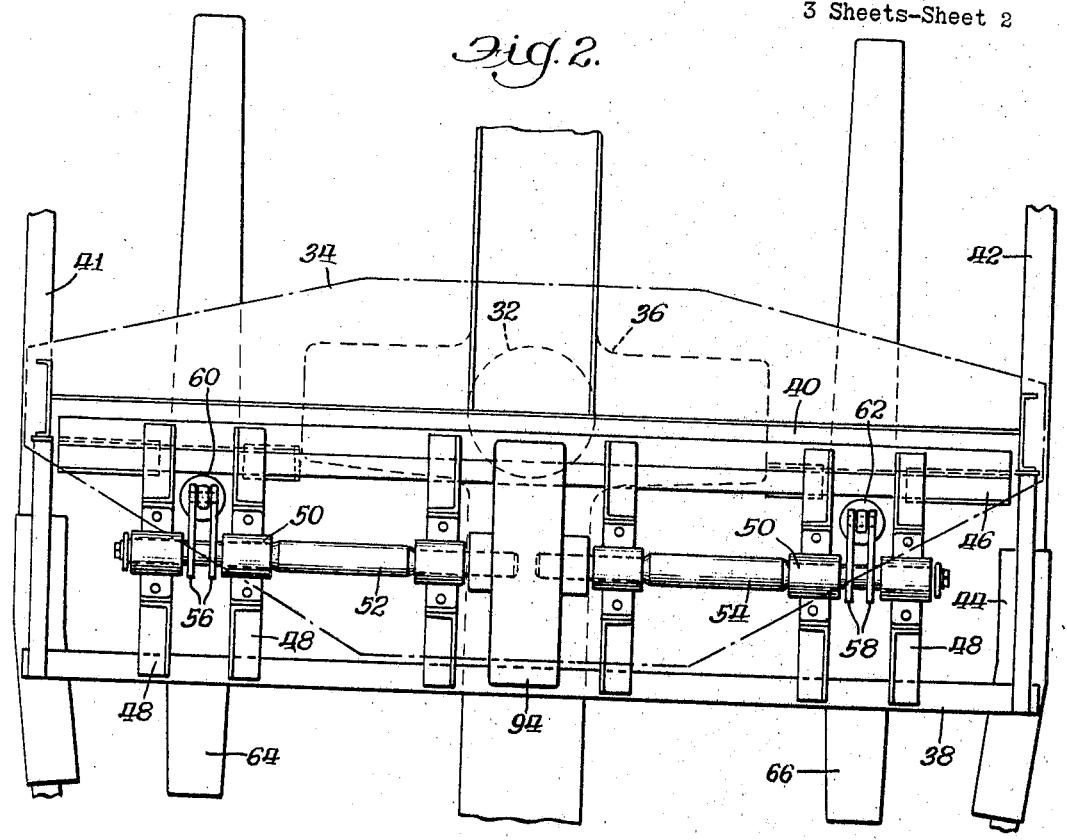
FIGURE 2 is an overall plan view of the presently described invention.

It will be understood that certain details have been omitted from some of the above views for the sake of clarity or in those instances where those details are better illustrated in other views.

The car body roll referred to herein may be best illustrated by reference to FIGURE 1, which shows a railway car truck 10 supporting a car body 12. The car truck 10 comprises a pair of spaced side frames 14 non-resiliently supported upon wheel and axle assemblies 16, the wheels of which assemblies travel on rails 11. A truck bolster 18 having a truck center plate 19 interconnects side frames 14 and is resiliently supported near its ends on spring groups, indicated diagrammatically at 20, within the side frames. The car body 12 is supported transversely on a car bolster 22 having a center plate 4 which rests on the center plate 19 of the truck bolster 18. Side bearings 26 having pads 28 are mounted adjacent opposite ends of the truck bolster 18 and are engageable with similar bearings 30 on the car bolster 22.

During normal operation of the vehicle shown, substantially all of the weight of the car body 12 acts upon the truck bolster 18 through the center plates 24 and 19. The side bearings 26 serve to stabilize the car during negotiations of curves but ordinarily provide no support for the car body.

As the wheels 16 roll along the rails 11, elevations or depressions in each rail, such as those caused by staggered rail joints, may cause the car body 12 to rock from side to side on its center plate 24 relative to the car truck 10. This condition is amplified at certain speeds if the wheels 16 pass over rail irregularities at appropriate times in the roll cycle, and the side bearings 26 and 30 may engage with considerable force. The present invention contemplates the provision of suitable means to oppose those forces generated by such motion of the car body relative to the side frames.

Figure 3:
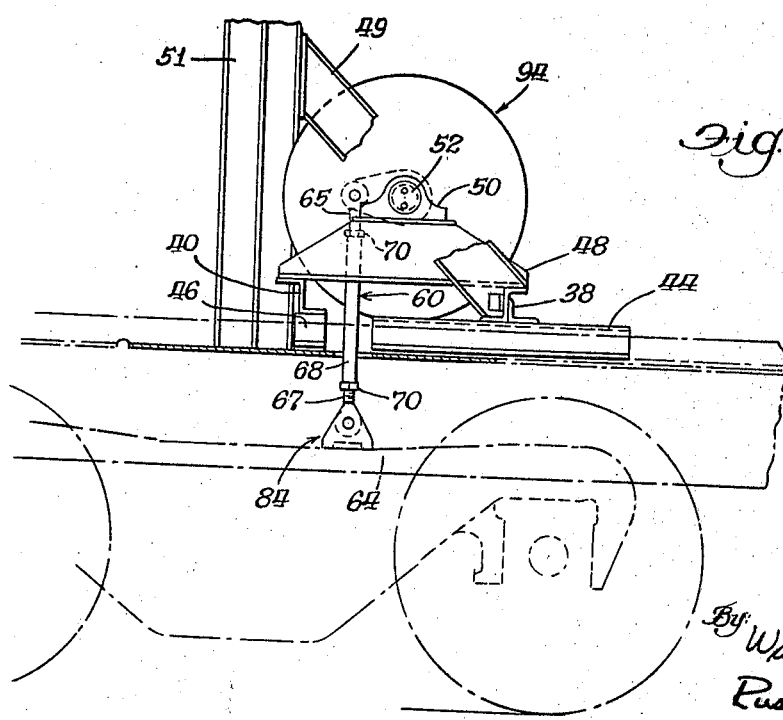
FIGURE 3 is an elevational view, with certain parts broken away, as seen from the left of FIGURE 2.

As shown in FIGURES 2, 3 and 4, the inventive device may be mounted longitudinally outwardly of the car body center plate 32 above the top plate 34 of the body bolster 36. Two spaced transverse support members 38 and 40 extend between the car body side sills 41 and 42, the end of said support members being secured to respective brackets 44 and 46 secured to said side sills. A plurality of bearing mounts 48 are secured between transverse support members 38 and 40. Bearing mounts 48 carry bearings 50 in which are rotatably journaled two coaxial shafts 52 and 54. At least one, and in this case, pairs of cranks 56 and 58 are secured near the outboard end of each respective shaft 52 and 54. A shown in FIGURE 3, angle supports 49 may be provided between the transverse support member 38 and a side post 51 or other vertical frame member of the car body, in order to give additional support to the entire structure.

Connecting rods 60 and 62 are provided between each pair of cranks 56 and 58 and the top of corresponding side frames 64 and 66 of the car truck. Connecting rods 60 and 62 serve to transmit lateral rocking motions of the car body relative to the side frames to cranks 56 and 58, and this causes the coaxial shafts 52 and 54 to rotate in opposite directions. It should be noted that relative rotation of the shafts 52 and 54 will occur only during relative rocking motions between the side frames 64 and 66 and the car body and not during the conjoint movement of both side frames relative to both sides of the car body, since such movement could only result in rotation of the shafts in the same direction.

As shown in FIGURES 3 and 5, each connecting rod 60 or 62 may comprise upper and lower threaded rod sections 65 and 67 respectively, said sections being connected by an internally threaded sleeve 68 and held in adjustment by jam nuts 70 on each of said rod sections and abutting said sleeve. This feature allows the effective length of the rod to be conveniently adjusted after installation.

Also, means are provided in the connecting rods 60 and 62 to allow swiveling of the car truck in a horizontal plane relative to the car truck, which most often occurs when the railway vehicle is negotiating a curve. As best shown in FIGURE 5, a ball joint 72 is provided between the lower end of connecting rods 60 and 62 and respective side frames 64 and 66. Ball joint 72 on rod 60 comprises a ball member 74 protected on both sides thereof by shims 76 and 78 and connected by a bolt 79 passing through said ball and shims between spaced vertical members 80 and 82 of a bracket 84 secured to the side frame 64, said bolt being secured by a nut 81. The lower end of connecting rod 60 has a socket 85 complementary with and slidably engaging ball member 74.

A similar ball joint 86 is provided between the upper end of connecting rods 60 and 62 and crank pairs 56 and 58, respectively. In this instance, however, a ball member 88 is held by a bolt 90 and a nut 92. The bolt 90 also passes through crank pair 56, with a crank located on both sides of the ball member. Thus, connecting rods 60 and 62 and their accompanying ball joints provide a positive tension and compression link responsive to relative vertical motions, but allow flexibility to compensate for relative horizontal motions.

The inboard ends of coaxial shafts 52 and 54 terminate in a friction mechanism 94 that resists relative rotation of said shafts in both directions. As shown in FIGURE 6, mechanism 94 may comprise a hub 96 secured to left shaft 52. An inflatable torus-shaped bag 98, fabricated of flexible air-retaining material is secured around hub 96 in an annular channel 97 and is connected to an air supply line 100. The inboard end of the right shaft 54 is also secured to a hub 102 having a flange 104. Interlocked segmental friction shoes 106 are interposed between the flange 104 and the inflatable bag 98. When bag 98 is inflated by means of a compressed air supply through line 100, its outer periphery urges the interlocked segmental friction shoes 106 into engagement with flange 104, which causes relative rotation between the shafts 52 and 54 to be inhibited in both directions.

It should now be obvious that several modifications may be made relative to the arrangement of parts in the present invention. For example, the coaxial shafts 52 and 54 and friction mechanism 94 may be mounted on the car truck, rather than the car body, and the connecting rods 60 and 62 may be connected from the car body to give the same benefit.

Another embodiment of the present invention is shown in FIGURE 7, wherein one shaft 108 replaces the two aforesaid coaxial shafts. Shaft 108 is suitably supported on the car body or truck in bearings 110 and 112 proximate the ends of said shaft. A conventional brake assembly 114 is provided near one end of the shaft 108 and comprises a brake drum 116 secured to the shaft and a hub 118 journaled on the shaft. The hub 118 has a pin 120 on which brake heads 122 and friction shoes 124 are mounted. Suitable spring means, indicated schematically at 126 are provided to urge the friction shoes 124 continuously against the brake drum 116. A crank arm 128 is secured near the end of shaft 108 distal from the brake assembly 114 and a second crank arm 130 is secured to the hub 118.

In operation, movement of one crank arm 128 or 130 relative to the other causes relative movement between the brake drum 116 and friction shoes, 124, thereby dissipating energy and providing another means for reducing the rocking motions between the car body and truck.

It will be apparent to those skilled in the art that additional modifications may be made without departing from the spirit of the appended claims.

Having thus described the invention, what is claimed is:

1. In conjunction with a railway vehicle having a truck including spaced side frames supported upon wheel and axle assemblies, said vehicle also having a car body supported upon the car truck, a railway car roll stabilizer comprising at least one shaft, means on said car body supporting said shaft for rotation thereof, rotation resisting means for yieldingly resisting rotation of said shaft, crank means on said shaft, and connecting means between said crank means and the truck side frames for actuating said crank means to rotate said shaft relative to said rotation resisting means upon rocking motions of the car body relative to the truck, whereby said rocking motions are dampened.

2. The invention according to claim 1 wherein two coaxial shafts are provided and the rotation resisting means is connected between the opposing ends of said shafts for resisting relative rotation thereof.

3. The invention according to claim 1 wherein one shaft is provided and is operatively connected to one connecting means; and wherein said rotation resisting means is positioned around said shaft and operatively connected to another connecting means.

4. In conjunction with a railway vehicle having a truck including spaced side frames conventionally supported upon wheel and axle assemblies and a car body supported upon the car truck, a stabilizer comprising a pair of coaxial shafts positioned transversely of the car body and journaled therein, crank means secured proximate the outboard end of each shaft, connecting rod means operatively connecting said crank means with a corresponding side frame of the car truck, means associated with the inboard ends of said shafts, for resisting relative rotation therebetween.

5. The invention according to claim 4 wherein the connecting rod means is provided with a ball joint at both ends thereof.

6. The invention according to claim 4 wherein the rod means further comprises two threaded rod sections interconnected by an internally threaded sleeve.

7. In conjunction with a railway vehicle including a car body having spaced side sills and a center plate, and a car truck having spaced side frames and supporting said car body, a car body roll stabilizer comprising a pair of spaced transverse support members secured between said side sills, a plurality of bearing mounts secured between said transverse support members, a bearing carried by each of said bearing mounts, a pair of coaxial shafts journaled in said bearings and positioned longitudinally outwardly of said car body center plate, at least one crank secured near the outboard end of each coaxial shaft and above a respective side frame of the car truck, a connecting rod operatively connected between each side frame and a respective crank, said connecting rod being adjustable as to length and provided with ball joints at both ends thereof, and means associated with the inboard ends of said coaxial shafts for yieldingly resisting relative rotation therebetween.

8. In conjunction with a railway vehicle having a truck including spaced side frames supported upon wheel and axle assemblies and a car body supported upon the truck, a railway car roll stabilizer comprising a shaft, means on said car body supporting said shaft for rotation thereof, a first crank means secured proximate one end of said shaft, rotation resisting means proximate the other end of the shaft and comprising a brake drum secured to said shaft and a brake shoe assembly journaled on said shaft in frictional engagement with said brake drum, a second crank means secured to said brake shoe assembly, and connecting rod means operatively connecting said first and second crank means with a corresponding side frame of the car truck.

References Cited

UNITED STATES PATENTS 2,960,941  11/1960  Li _____ 105—164

ARTHUR L. LA POINT, Primary Examiner

H. BELTRAN, Assistant Examiner

U.S. Cl. X.R.

105—164, 200; 280—104.5